(12) United States Patent
Xu et al.

(10) Patent No.: US 8,656,377 B2
(45) Date of Patent: Feb. 18, 2014

(54) TRACKING VARIABLE INFORMATION IN OPTIMIZED CODE

(75) Inventors: Lin Xu, Seattle, WA (US); Weiping Hu, Sammamish, WA (US); Yongkang Zhu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 12/813,404

(22) Filed: Jun. 10, 2010

(65) Prior Publication Data

US 2011/0307875 A1    Dec. 15, 2011

(51) Int. Cl.
G06F 9/45    (2006.01)

(52) U.S. Cl.
USPC ............................ 717/151; 717/141; 717/146

(58) Field of Classification Search
USPC .................................................. 717/140–161
See application file for complete search history.

(56) References Cited

U.S. PATENT DOCUMENTS

| | | | | |
|---|---|---|---|---|
| 5,179,702 | A * | 1/1993 | Spix et al. | 718/102 |
| 5,493,675 | A * | 2/1996 | Faiman et al. | 717/151 |
| 5,500,861 | A | 3/1996 | Levin et al. | |
| 5,590,332 | A | 12/1996 | Baker | |
| 5,659,754 | A * | 8/1997 | Grove et al. | 717/158 |
| 5,956,512 | A | 9/1999 | Simmons et al. | |
| 6,072,952 | A * | 6/2000 | Janakiraman | 717/155 |
| 6,249,910 | B1 * | 6/2001 | Ju et al. | 717/146 |
| 6,625,797 | B1 | 9/2003 | Edwards et al. | |
| 6,675,378 | B1 | 1/2004 | Schmidt | |
| 6,678,884 | B1 | 1/2004 | Kesselman et al. | |
| 6,795,963 | B1 * | 9/2004 | Andersen et al. | 717/130 |
| 6,944,797 | B1 | 9/2005 | Guthrie et al. | |
| 6,976,261 | B2 | 12/2005 | Callsen et al. | |
| 7,058,928 | B2 | 6/2006 | Wygodny et al. | |
| 7,076,773 | B2 | 7/2006 | Schmidt | |
| 7,703,075 | B2 * | 4/2010 | Das et al. | 717/123 |
| 7,788,657 | B2 * | 8/2010 | Wannamaker et al. | 717/158 |
| 7,890,942 | B2 | 2/2011 | Nair | |
| 7,917,888 | B2 * | 3/2011 | Chong et al. | 717/102 |
| 2002/0095660 | A1 * | 7/2002 | O'Brien et al. | 717/127 |
| 2002/0138819 | A1 * | 9/2002 | Hills | 717/114 |
| 2004/0078784 | A1 | 4/2004 | Bates et al. | |
| 2004/0078789 | A1 | 4/2004 | Ghiya | |

(Continued)

OTHER PUBLICATIONS

Maher et al., "Software-controlled Memory Compression Using Informing Memory Operations", May 9, 2006, [retrieved from http://citeseerx.ist.psu.edu/viewdoc/summary?doi=10.11.109.6157], p. 1-10.*

(Continued)

Primary Examiner — Satish Rampuria
(74) Attorney, Agent, or Firm — Kevin Sullivan; Kate Drakos; Micky Minhas (57) ABSTRACT

Embodiments are directed to tracking variable location information in optimized code and efficiently collecting and storing reaching definition information. A computer system receives a portion of source code at a compiler, where the compiler is configured to compile and optimize the source code for execution. The computer system tags selected variables in the source code with a tag, where the tag is configured to provide location information for the variable. The computer system optimizes the received portion of source code including changing at least one of the tagged variables. The computer system also tracks the tagged variables as the variables are changed by the compiler during code optimization and persists the variable location information, so that the persisted variable location information is available to other compiler components.

17 Claims, 4 Drawing Sheets

(56) References Cited

U.S. PATENT DOCUMENTS

| | | | |
|---|---|---|---|
| 2005/0066313 A1 | 3/2005 | Bates et al. | |
| 2006/0158354 A1 | 7/2006 | Aberg et al. | |
| 2006/0248199 A1 | 11/2006 | Stanev | |
| 2006/0294502 A1* | 12/2006 | Das et al. | 717/129 |
| 2007/0028222 A1 | 2/2007 | Meijer et al. | |
| 2007/0113219 A1 | 5/2007 | Terry | |
| 2008/0016496 A1 | 1/2008 | Li et al. | |
| 2008/0244516 A1* | 10/2008 | Meijer et al. | 717/116 |
| 2008/0244534 A1 | 10/2008 | Golender et al. | |
| 2011/0231829 A1* | 9/2011 | MacLeod et al. | 717/159 |

OTHER PUBLICATIONS

Steven S. Muchnick, "Advanced Compiler Desigh and Implementation", 1997, Morgan Kaufmann Publishers, p. 218-223.*

Rossen Stoyanchev, "Using the "Mark Occurrences" Feature of Eclipse for Reading Java Methods", Sep. 23, 2008, [retrieved from http://www.rossenstoyanchev.org/write/prog/eclipse/eclipse4.html], p. 1-4.*

John Hennessy, "Symbolic Debugging of Optimized Code", Jul. 1982, [retrieved from http://dl.acm.org/citation.cfm?id=357173], p. 323-344.*

Brooks, Gary, Gilbert J. Hansen, and Steve Simmons. "A new approach to debugging optimized code." ACM SIGPLAN Notices. vol. 27. No. 7. ACM, 1992, pp. 1-11.*

Rapps, Sandra, and Elaine J. Weyuker. "Selecting software test data using data flow information." Software Engineering, IEEE Transactions on 4 (1985), pp. 367-375.*

Hennessy, John. "Symbolic debugging of optimized code." ACM Transactions on Programming Languages and Systems (TOPLAS) 4.3 (1982): pp. 323-344.*

U.S. Appl. No. 60/908,091, filed Mar. 26, 2007, Meijer.

U.S. Appl. No. 11/829,072, filed Jul. 26, 2007, Meijer.

Mario Wolczko, Semantics of Object-Oriented Languages. Published Mar. 1998. http://www.wolczko.com/mushroom/theses/wolczko.ps.Z. Last Accessed on Mar. 15, 2007.

Wei-Ngan Chin, et al. Region Type Checking for Core-Java. Http://dspace.mit.edu/retrieve/3737/CS020.pdf. Last accessed Mar. 15, 2007.

Bruno Blanchett. Escape Analysis ofr Object Oriented Languages. Application to JavaTM. OOPSLA '99. Nov. 1999, Denver Co, USA. 1999 ACM http:////delivery.acm.org/10.1145/330000/320387/p20-blanchet.pdf?key1=320387&key2=9044683711&coll=GUIDE&CFID=16889188&CFTOKEN=58353024 Last Access Mar. 15, 2007.

Peter Sestoft. Replaccing Function Parameters by Global Variables, 1989 ACM, 0009, pp. 39-53, http://delivery.accm.org/10.1145/10000/99374/p39-sestoft.pdf?key1=99374&key2=0414683711&coll=GUIDE&dl=GUIDE&CF1D=16888572&CFTOKEN=66700738. Last Accessed on Mar. 15, 2007.

Zhong Shao, et al. Space-Efficient Closure Representations. LISP 94 Jun. 1994 Orlando, Florida, USA. 1994 ACM. Http://delivery.acm.org/10.1145/16000/156783/p150-shao.pdf?key1=156783&key2=5683683711&coll=GUIDE&dl=GUIDE&CFID=16888572&CFTOKEN=66700738. Last Accessed Mar. 15, 2007.

Martin Fowler. Closure. Published Sep. 8, 2004. http://martinfowler.com/bliki/Closure.html.

Dustin Campbell. What's a closure. Published Feb. 9, 2007 http://diditwith.net/2007/02/09/WhatsInAClosure.aspx.

Morrisett, "Typed Closure Conversion for Recursively-Defined Functions", Jun. 2, 1998, p. 1-12.

U.S. Appl. No. 11/829,072, Mail Date May 5, 2011, Office Action.

U.S. Appl. No. 11/829,072, Mail Date Oct. 26, 2011, Office Action.

What does "Optimize Code" option really do in Visual Studio?—Published Date: Sep. 22, 2008 http://stackoverflow.com/questions/113866/what-does-optimize-code-option-really-do-in-visual-studio (2 pages).

A Practical, Robust Method for Generating Variable Range Tables—Published Date: Sep. 15, 2000 http://www.hpl.hp.com/techreports/Compaq-DEC/SRC-RR-165.pdf (21 pages).

Comparison Checking: An Approach to Avoid Debugging of Optimized Code—Published Date: 1999 http://www.cs.virginia.edu/~soffa/research/SE/fse99.ps (17 pages).

Practical ne-grained static slicing of optimized code—Published Date: Jul. 26, 1994 http://citeseerx.ist.psu.edu/viewdoc/download?doi=10.1.1.3.698&rep=rep1&type=pdf (17 pages).

Debugging Optimized Code with Dynamic Deoptimization—Published Date: 1992 http://citeseerx.ist.psu.edu/viewdoc/download?doi=10.1.1.24.7217&rep=rep1&type=pdf (12 pages).

* cited by examiner

TRACKING VARIABLE INFORMATION IN OPTIMIZED CODE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, specialized software applications may be used to write source code for other software applications. These applications are typically referred to as integrated development environments or IDEs. IDEs usually include a debugger which allows the user to check the source code for errors. Using a debugger, a developer can step through his or her software program line by line to determine what is happening at each step. In many cases, debuggers are able to provide information about the program's different variables. However, once the code has been compiled and optimized, many of the program's variables have changed. The developer then has to analyze the binary code him-or herself to determine the variables' values.

BRIEF SUMMARY

Embodiments described herein are directed to tracking variable location information in optimized code and efficiently collecting and storing reaching definition information. In one embodiment, a computer system receives a portion of source code at a compiler, where the compiler is configured to compile and optimize the source code for execution. The computer system tags selected operations and/or variables in the source code with a tag, where the tag is configured to provide location information for variables in the operation. The computer system optimizes the received portion of source code including changing at least one of the tagged variables. The computer system also tracks the tagged variables as the variables are changed by the compiler during code optimization and persists the variable location information, so that the persisted variable location information is available to other compiler components.

In another embodiment, a computer system accesses a portion of persisted variable location information. The computer system calculates various reaching definitions for different variables implemented by a compiler during code optimization. The reaching definitions include sets of instructions for which the variables possess an indicated location, so that each variable that is written to is represented by its reaching definition. The computer system compresses the calculated reaching definitions using a domain-specific compression algorithm and sends the compressed reaching definitions from the compiler to the debugger for display to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to tracking variable location information in optimized code and efficiently collecting and storing reaching definition information. In one embodiment, a computer system receives a portion of source code at a compiler, where the compiler is configured to compile and optimize the source code for execution. The computer system tags selected variables in the source code with a tag, where the tag is configured to provide location information for the variable. The computer system optimizes the received portion of source code including changing at least one of the tagged variables. The computer system also tracks the tagged variables as the variables are changed by the compiler during code optimization and persists the variable location information, so that the persisted variable location information is available to other compiler components.

In another embodiment, a computer system accesses a portion of persisted variable location information. The computer system calculates various reaching definitions for different variables implemented by a compiler during code optimization. The reaching definitions include sets of instructions for which the variables possess an indicated location, so that each variable that is written to is represented by its reaching definition. The computer system compresses the calculated reaching definitions using a domain-specific compression algorithm and sends the compressed reaching definitions from the compiler to the debugger for display to the user.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
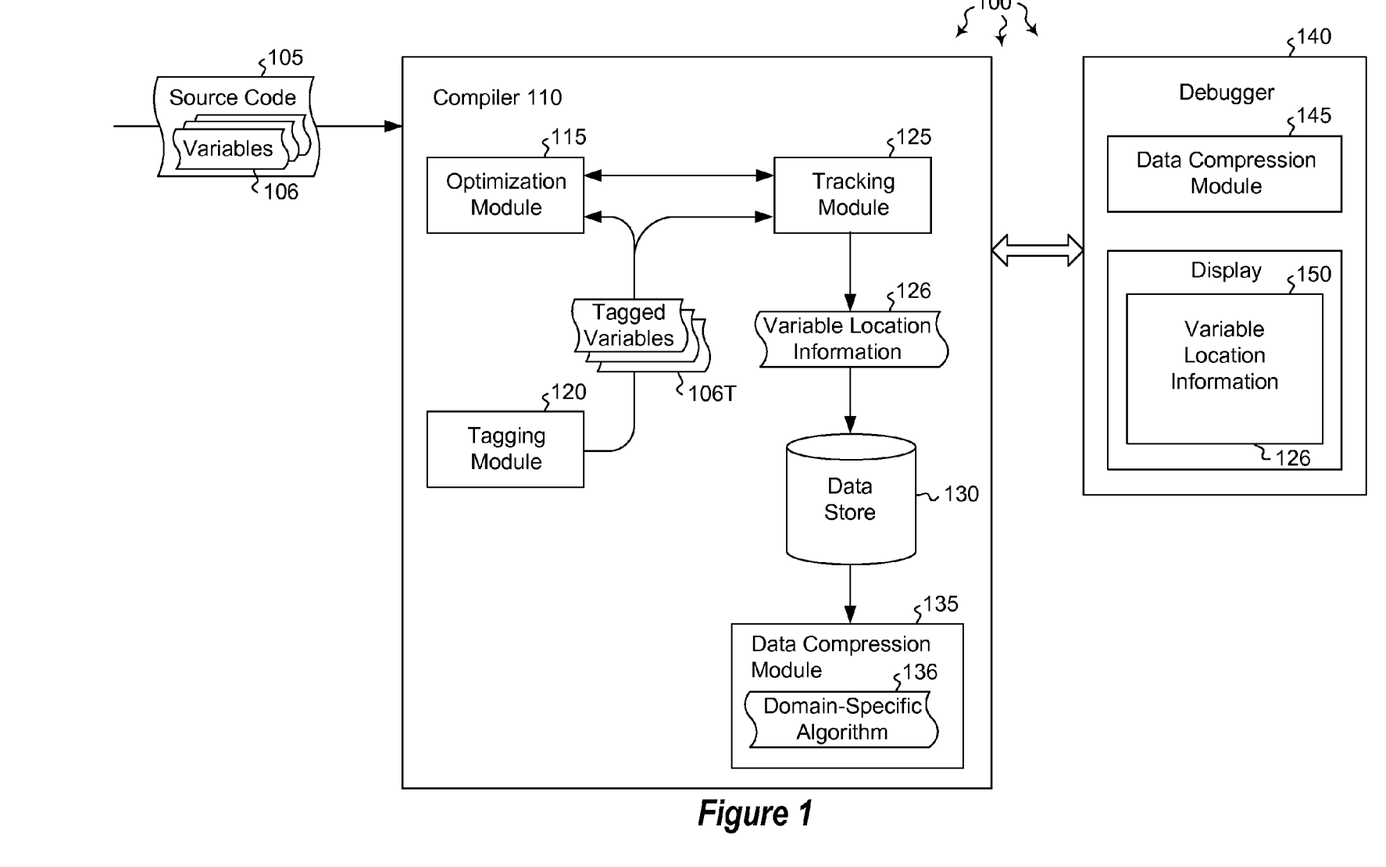
FIG. 1 illustrates a computer architecture in which embodiments of the present invention may operate including tracking variable location information in optimized code and efficiently collecting and storing reaching definition information.

FIG. 1 illustrates a computer architecture 100 in which the principles of the present invention may be employed. Computer architecture 100 includes compiler 110. Compiler 110 may be any type of software code compiler configured to compile code written in any of a number of different software programming languages. Compiler 110 may receive source code 105 as an input and compile that code into executable code. In some cases, compiler 110 may be configured to compile the code into an intermediate language (IL) form where the code can be optimized (e.g. by optimization module 115) before conversion into actual machine-readable instructions. These optimizations may include making changes to variables or other portions of the software code. Thus, the variables 106 included in source code 105 may be removed, replaced or rearranged during code optimization.

Tagging module 120 may be configured to tag some or all of the variables 106 (resulting in tagged variables 106T) before the compiler converts the code to IL form. The tags may be any type of identifier or other identifying mechanism that allows tracking module 125 to track the location of the variable. Thus, as variables are changed or moved during code optimization, the tags track the location of the variables. Additionally or alternatively, when variables are removed or replaced during optimization, the tags may adhere to the values or instructions that were being represented by the variable and are now replacing the variable. Thus, the instructions, code or values represented by the replaced or removed variable may be tracked in its place.

While tracking the location of the tagged variables 106T, tracking module 125 may send variable location information 126 to data store 130. Data store 130 may be any type of magnetic or optical storage and may include databases, storage area networks or any other data storage solutions. In some cases, data store 130 may be communicatively coupled to (or part of) compiler 110 or may be separate from the compiler and perhaps even on another computing system. The stored variable location information 126 may then be compressed by data compression module 135 using a domain-specific algorithm and transferred to debugger 140. Debugger 140 may be any type of software application configured to debug software applications, functions or programs.

Debugger 140 may decompress the compressed variable location information using data decompression module 145. After (or as) the variable location information 126 is decompressed, it may be displayed on display 150 of the debugger. Thus, the user may visually see where each variable is located in the intermediate language form of the source code. This and other concepts will be explained in greater detail below with regard to method 200 of FIG. 2.

Figure 2:
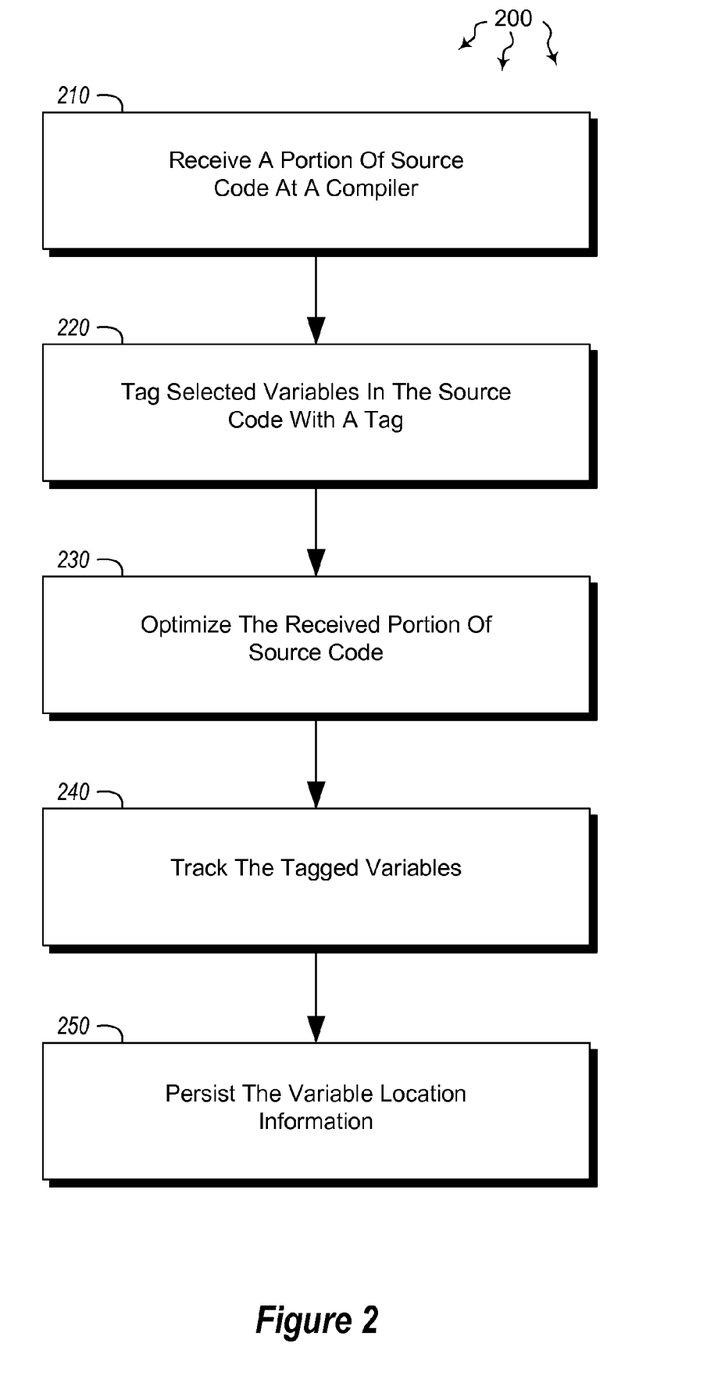
FIG. 2 illustrates a flowchart of an example method for tracking variable location information in optimized code.
Figure 3:
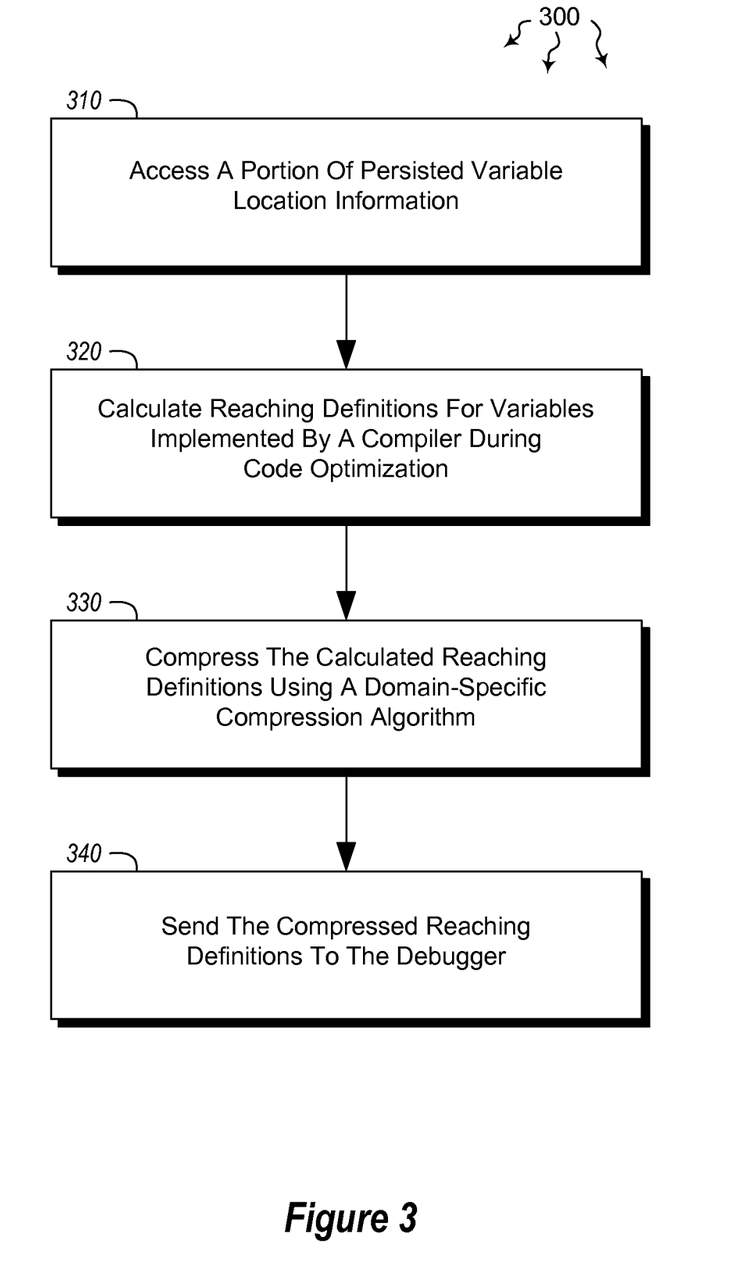
FIG. 3 illustrates a flowchart of an example method for efficiently collecting and storing reaching definition information.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for tracking variable location information in optimized code. The method 200 will now be described with frequent reference to the components and data of environment 100 of FIG. 1, as well as FIGS. 4A and 4B.

Method 200 includes an act of receiving a portion of source code at a compiler, wherein the compiler is configured to compile and optimize the source code for execution (act 210). For example, compiler 110 may receive source code 105 which includes variables 106. The compiler may be configured to compile and optimize the source code for execution. As explained above, code optimization includes converting the code to an intermediate form or intermediate language which can then be changed and altered to improve efficiency. For instance, in one simplistic example, if the source code said that variable x was equal to variable a (e.g. x==a), everywhere that variable x appeared in the source code, it could be replaced by variable a. This is only one example and, as will be understood by one skilled in the art, many more complex forms of optimization are possible.

Method 200 includes an act of tagging one or more selected variables in the source code with a tag, wherein the tag is configured to provide location information for the variable (act 220). For example, tagging module 120 may tag one or more of variables 106 in source code 105 with a tag, resulting in tagged variables 106T. The tag provides location information for the variable (or instructions) to which it is tagged. Using the tag, a tracking module 125 can track the current location (in memory or in hardware (e.g. processor registers)) of the variables.

In some embodiments, a user may select which variables are to be tagged. The user may be a software programmer, an administrator, and end user or any other type of user. Additionally or alternatively, the user may select or deselect in real time which of the user-selected variables are to be tracked. Thus, if a user no longer wishes to track a variable or wants to track a new or different variable, the user can choose which variables are tagged as well as which variables are tracked.

The variable location information 126 generated by the tracking module 125 may include memory addresses, register identifier or any other hardware or software location identifiers. The variable location information may be incremented in real time or may be updated at certain predefined intervals. Thus, as the variables change locations during code optimization, the variables' locations may be tracked. In some cases, the compiler may be configured to determine, for each memory address, which variable is currently stored at each address and how long the variable has been stored there.

Figure 4A:
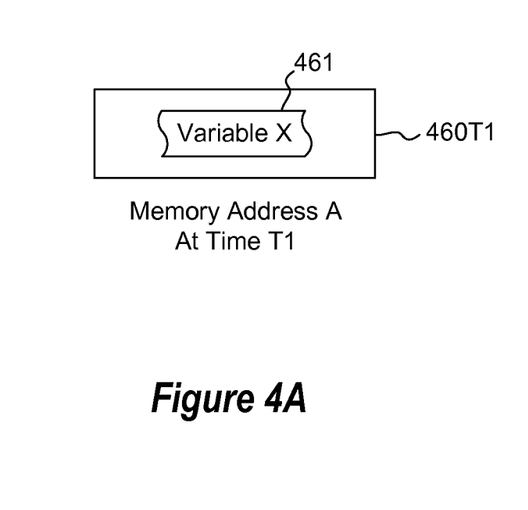
FIGS. 4A and 4B illustrate embodiments in which different variables occupy the same memory space at different times.
Figure 4B:
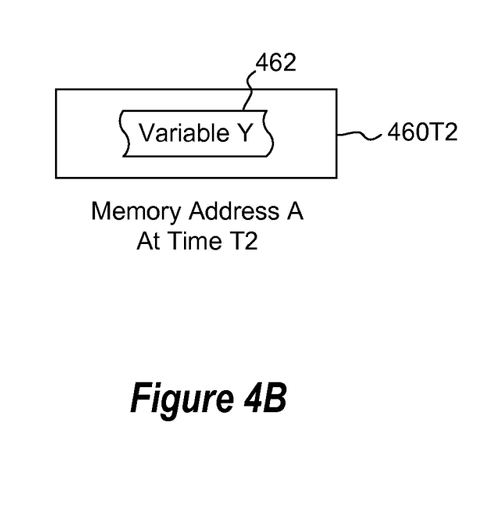

For example, as shown in FIGS. 4A and 4B, memory address A at time T1 (460T1) may include variable x (461), whereas the same memory address A at time T2 (460T2) may include variable y (462). Thus, in such cases, the compiler may be able to determine at time T1 that variable x is residing in memory address A. Moreover, the compiler may be able to determine at time T2 that variable y is residing in memory address A and that variable x has been moved. Assuming variable x (461) has been tagged, tracking module 125 can track the current location of variable x. In some cases, the variable location information generated by the tracking module may include a mapping between a variable named in the source code and one or more variables created during optimization. This mapping may be used to keep track of source variables that are removed or altered as well as the source variables' link to newly generated variables created during code optimization.

Returning to FIG. 2, method 200 includes an act of the compiler optimizing the received portion of source code, wherein optimizing at least includes changing one or more of the tagged variables (act 230). For example, compiler 110 may optimize the received portion of source code 105. As mentioned previously, optimizing the source code for efficient execution may include making little to no changes or may include making large changes including many different types of changes. The source code may be altered, rearranged or moved, portions may be substituted or removed entirely and new portions may be added. The changes may occur at runtime and may vary depending on hardware or software limitations.

Method 200 includes an act of tracking the tagged variables as the variables are changed by the compiler during code optimization (act 240). For example, tracking module 125 may track tagged variables 106T as the variables are changed by compiler 110 during code optimization. The tagged variables may change locations in memory or may be moved between processor registers. Moreover, the tagged variables may be altered, removed or substituted with other variables. Accordingly, the tag can be used to track either or both of the actual tagged variable and the instructions or values represented by the variable. Thus, for example, when a variable is replaced with a different variable or value, that new replacement variable or value can be tracked using the tag that was tagged to the original variable. Knowledge of the current location of variables within the intermediate language form of the source code is used by developers to debug or test the program.

Method 200 also includes an act of persisting the variable location information, such that the persisted variable location information is available to one or more other compiler components (act 250). For example, data store 130 may persist variable location information 126 so that the variable location information is available to other compiler components. For example, information 126 may be compressed by data compression module 135 for transfer to debugger 140. Moreover, various tools can use the variable location information such as code analysis tools, code instrumentation tools, code coverage tools and automated bug analysis tools.

In some embodiments, data compression module 135 may be used to compress the persisted variable location information 126 using a domain-specific compression algorithm 136. In some cases, the domain-specific algorithm may be a lossy algorithm in that only those information points necessary for a certain task (e.g. debugging) may be stored during compression. The algorithm is domain-specific in that it applies to the program or type of software program that is being compiled. The compressed variable location information may then be decompressed at the debugger 140 using data decompression module 145. After the variable location information is decompressed, it may displayed to a user on display 150. The user may then be able to ascertain where each tagged variable is within the intermediate (optimized) form of the program. In some cases, the variables and/or the tags may be highlighted in some manner to better distinguish them from the surrounding code.

Turning now to FIG. 3, FIG. 3 illustrates a flowchart of a method 300 for efficiently collecting and storing reaching definition information. The method 300 will now be described with frequent reference to the components and data of environment 100.

Method 300 includes an act of accessing at least a portion of persisted variable location information (act 310). For example, a computer system or software program may access the variable location information 126 stored in data store 130. In some cases, the persisted variable location information may have been generated without any direct knowledge of what code optimizations were made during code optimization. For example, tracking module 125 may generate the variable location information by performing analysis on the program after all optimizations are complete. In this case, the tracking module may analyze what occurred during optimization without knowing how the optimizations were going to occur. Thus, regardless of how the source code 105 is optimized, tracking module 125 can generate variable location information using the tags without having different compiler components each separately keeping track of debugging information.

In some cases, the variable location information 126 may be generated when various structure member fields and/or global variables are promoted to registers. Such register promotion occurs quite frequently in many software languages as it can result in significant performance increases. Knowing the variable location information at this time may be very useful to software developers. Additionally or alternatively, variable location information may be generated in different manners depending on runtime state. For example, a memory location may be used (or "owned") by different variables depending on runtime behavior. The program's structure may be broken down into different members, and the developer may not know which variable is at a given register because it depends on the program's control flow. For instance, an "if" statement may result in different variables being in different memory locations depending on whether the "if" statement was true or false.

Method 300 includes an act of calculating one or more reaching definitions for one or more different variables implemented by a compiler during code optimization, wherein the reaching definitions comprise sets of instructions for which the variables possess an indicated location, such that each variable that is written to is represented by its reaching definition (act 320). For example, a computer system may calculate reaching definitions for tagged variables 106T that are implemented by compiler 110 during code optimization. The reaching definitions include sets of instructions for which the variables possess an indicated memory or other hardware location. Thus, each variable that is written to is represented by its reaching definition.

In some cases, at least one of tagged variables 106T is generated by the compiler 110 during code optimization and lacks a variable name. These variables are used throughout optimization and may be mapped by the optimization module 115 to the original variables 106T. Such compiler-generated variables may include temporary variables and merged variables. These compiler generated variables may be tracked using tags that keep track of the original variable's reaching definitions.

Returning to FIG. 3, method 300 also includes an act of compressing at least one of the calculated reaching definitions using a domain-specific compression algorithm (act 330). For example, data compression module 135 may compress at least one of the calculated reaching definitions using domain-specific algorithm 136. The domain-specific algorithm may include any or all of the following: merging variable location information, dropping at least a portion of recoverable variable location information and compressing at least a portion of the reaching definitions in a lossless manner.

When compressing, the data compression module looks at a variable's stack location and one or more register locations. Then, instead of generating multiple records that may include gaps to ensure that a variable has at most exactly 1 recorded location, module 135 may be configured to generate a full scope stack location, and generate register location records. Thereafter, when the data is decompressed the correct ranges may be reconstructed so that the original invariant—that a variable has at most one location—is again valid.

Still further, data compression module 135 may be configured to compress a data representation of each variable's reaching definition range. A variable may have many reaching definition ranges. Instead of recording N ranges, data compression module 135 may be configured to merge those ranges owning the same location together to generate one data record that records the start and the end of the combined range, as well as the gaps inside the range that are not covered by the combined range. The number of gaps will be less than N and may be much smaller. This greatly decreases the amount of space required to store the variable location information.

Lastly, method 300 includes an act of sending the compressed reaching definitions from the compiler to the debugger for display to the user (act 340). For example, data decompression module 145 of debugger 140 may decompress the variable location information and sending the information to display 150 for display to the debugger user. Those portions of the variable location information that were compressed with the algorithm 136 are decompressed while the unnecessary information lost during compression remain unused. In this manner, only the information needed for tracking the variable's location in the intermediate language form is preserved for display at the debugger.

Accordingly, methods, systems and computer program products are provided that track variable location information in optimized code and efficiently collect and store reaching definition information for variables in software source code. The tracked variable location information may be presented to a software developer in a debugger or other tool. This allows the developer to debug the application knowing where each of the application's variables is stored, even when the code is in an optimized, intermediate form.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, a computer-implemented method for tracking variable location information in optimized code, the method comprising the computer system performing the following acts:

receiving a portion of source code at a compiler, wherein the compiler is configured to compile and optimize the source code for execution;

tagging one or more selected variables in the source code with a tag, wherein the tag is configured to provide location information for the variable and wherein tagging the one or more selected variables occurs before the compiler converts the source code into an intermediate form;

the compiler optimizing the received portion of source code, wherein optimizing comprises changing one or more of the tagged variables and changing comprises replacing the one or more of the tagged variables with a value or a set of instructions;

tracking the tagged variables as the variables are changed by the compiler during code optimization, wherein tracking the tagged variables comprises each of tracking each change, move, and replacement of each of the tagged variables so that the tar associated with a tagged variable adheres to the value or set of instructions which replaced the tagged variable and so that the value or set of instructions which replaced the tagged variable are tracked in place of the tagged variable;

persisting the variable location information, so that the persisted variable location information is available to one or more other compiler components;

compressing the persisted variable location information using a domain-specific compression algorithm;

a debugger decompressing the compressed variable location information; and the debugger displaying the decompressed variable location information to a user.

2. The method of claim 1, further comprising an act of a user selecting which variables are to be tagged.

3. The method of claim 1, wherein the variable location information includes at least one of a memory address and a register identifier.

4. The method of claim 3, wherein at least one of the variables changes locations during code optimization.

5. The method of claim 3, wherein the compiler is configured to determine, for each memory address, which variable is currently stored at each address and how long the variable has been stored there.

6. The method of claim 3, wherein the persisted variable location information includes at least one mapping between a variable named in the source code and one or more variables created during optimization.

7. The method of claim 1, wherein the persisted variable location information is implemented by at least one of the following: code analysis tools, code instrumentation tools, code coverage tools and automated bug analysis tools.

8. A computer program product for implementing a method for efficiently collecting and storing reaching definition information, the computer program product comprising one or more computer-readable hardware storage devices having stored thereon computer-executable instructions that, when executed by one or more processors of the computing system, cause the computing system to perform the method, the method comprising:

receiving a portion of source code at a compiler, wherein the compiler is configured to compile and optimize the source code for execution;

tagging one or more selected variables in the source code with a tag, wherein the tag is configured to provide location information for the variable and wherein tagging the one or more selected variables occurs before the compiler converts the source code into an intermediate form;

the compiler optimizing the received portion of source code, wherein optimizing comprises changing one or more of the tagged variables and changing comprises replacing the one or more of the tagged variables with a value or a set of instructions;

calculating one or more reaching definitions for one or more tagged variables implemented by the compiler during source code optimization, wherein the reaching definitions comprise sets of instructions for which the variables possess an indicated location, so that each variable that is written to is represented by its reaching definition, wherein calculating the reaching definitions comprises tracking each change, move, and replacement of each of the one or more tagged variables during compilation and optimization of the one or more tagged variables so that the reaching definitions of the one or more tagged variables are tracked in place of the one or more tagged variables;

persisting the variable location information, so that the persisted variable location information is available to one or more other compiler components;

compressing at least one of the calculated reaching definitions using a domain-specific compression algorithm; and sending the compressed reaching definitions from the compiler to the debugger for display to the user.

9. The computer program product of claim 8, wherein at least one of the variables is generated by the compiler during code optimization.

10. The computer program product of claim 9, wherein the compiler-generated variable comprises at least one of a temporary variable and a merged variable.

11. The computer program product of claim 8, wherein at least one of the variables' names is altered by the compiler during code optimization.

12. The computer program product of claim 8, wherein the domain-specific algorithm includes the following:
 merging variable location information;
 dropping at least a portion of irrelevant variable location information; and
 compressing at least a portion of the reaching definitions in a lossless manner.

13. The computer program product of claim 8, wherein the variable location information was generated without any direct knowledge of what code optimizations were made during code optimization.

14. The computer program product of claim 8, wherein the variable location information is generated when one or more member fields of a structure are promoted to registers.

15. The computer program product of claim 8, wherein the variable location information is generated depending on runtime state.

16. The computer program product of claim 15, wherein a memory location is owned by different variables depending on runtime behavior.

17. A computer system comprising the following:
 one or more processors;
 system memory;
 one or more computer-readable storage media having stored thereon computer-executable instructions that, when executed by the one or more processors, causes the computing system to perform a method for tracking variable location information in optimized code, the method comprising the following:

receiving a portion of source code at a compiler, wherein the compiler is configured to compile and optimize the source code for execution;

tagging one or more selected variables in the source code with a tag, wherein the tag is configured to provide location information for the variable and wherein tagging the one or more selected variables occurs before the compiler converts the source code into an intermediate form;

the compiler optimizing the received portion of source code, wherein optimizing comprises changing one or more of the tagged variables and changing comprises replacing the one or more of the tagged variables with a value or a set of instructions;

tracking the tagged variables as the variables are changed by the compiler during code optimization, wherein tracking the tagged variables comprises each of tracking each change, move, and replacement of each of the tagged variables so that the tag associated with a tagged variable adheres to the value or set of instructions which replaced the tagged variable and so that the value or set of instructions which replaced the tagged variable are tracked in place of the tagged variable;

persisting the variable location information, so that the persisted variable location information is available to one or more other compiler components;

compressing the persisted variable location information using a domain-specific compression algorithm;

a debugger decompressing the compressed variable location information; and the debugger displaying the decompressed variable location information to a user.

* * * * *